(12) United States Patent
Givens (10) Patent No.: US 12,372,173 B2
(45) Date of Patent: Jul. 29, 2025

(54) SPLIT CLAMP FOR JOINING PIPE ENDS

(71) Applicant: RB Distribution, Inc., Colmar, PA (US)

(72) Inventor: Gabriel Lawrence Givens, Philadelphia, PA (US)

(73) Assignee: RB Distribution, Inc., Colmar, PA (US)

( * ) Notice: Subject to any disclaimer, the term of this patent is extended or adjusted under 35 U.S.C. 154(b) by 38 days.

(21) Appl. No.: 18/170,299

(22) Filed: Feb. 16, 2023

(65) Prior Publication Data

US 2024/0280197 A1    Aug. 22, 2024

(51) Int. Cl.
*F16L 21/06*    (2006.01)
*F16L 55/172*    (2006.01)

(52) U.S. Cl.
CPC ............. *F16L 21/065* (2013.01); *F16L 21/06* (2013.01); *F16L 55/172* (2013.01)

(58) Field of Classification Search
CPC ......... F16L 21/065; F16L 21/06; F16L 23/08; F16L 21/005; F16L 21/002; F16L 33/04; F16L 55/172
See application file for complete search history.

(56) References Cited

U.S. PATENT DOCUMENTS

| | | | | |
|---|---|---|---|---|
| 1,659,196 A | * | 2/1928 | Fulton | F16L 55/172 |
| 1,928,316 A | * | 9/1933 | Muto | F16L 21/06 |
| 2,227,551 A | | 6/1939 | Morris | |
| 2,570,419 A | * | 10/1951 | Allen | |
| 2,936,186 A | * | 5/1960 | Dunmire | F16L 21/005 |
| 4,215,883 A | * | 8/1980 | Brown, Sr. | F16L 21/065 |
| 4,653,782 A | * | 3/1987 | Munday | F16L 55/172 |
| 4,664,428 A | * | 5/1987 | Bridges | F16L 21/005 |
| 6,758,501 B2 | | 7/2004 | Amedure et al. | |
| 6,877,780 B2 | | 4/2005 | Potts et al. | |
| 7,520,539 B2 | | 4/2009 | Ignaczak et al. | |
| 2003/0178850 A1 | * | 9/2003 | Dole | F16L 21/06 |
| 2009/0189392 A1 | * | 7/2009 | Ignaczak | F16L 21/065 |
| 2013/0187345 A1 | * | 7/2013 | Beagen, Jr. | F16L 21/065 |

* cited by examiner

*Primary Examiner* — William S. Choi
(74) *Attorney, Agent, or Firm* — Volpe Koenig (57) ABSTRACT

A split pipe coupler having a pair of coupling bands with arcuate outer portions and semicircular inner portions that have dependent sides that define an interior channel and chamfered ends. A gasket has an interior diameter dimensioned to overlap the connected pipe ends. The fastening nuts and bolts draw the pair of coupling bands together and intermesh the chamfered ends of the semicircular inner portions.

17 Claims, 7 Drawing Sheets

SPLIT CLAMP FOR JOINING PIPE ENDS

BACKGROUND

There is an industry need for a pipe coupling that securely connects two pipes in an engine exhaust system. It is a common practice in the repair or servicing of an automobile exhaust system to replace a component by cutting the pipe to remove the component. In reassembling the system, the coupler must be capable of joining two pipes in a butt joint with a good seal against exhaust gas leakage. The use of a butt joint has the advantage of avoiding the need for slotted pipe ends or tapered and flared fittings.

There have been prior attempts to provide a pipe coupling which would meet the requirements of mechanical strength, exhaust gas sealing properties and long service life required by the automotive industry. It has been concluded that one cause for the failure of the prior art attempts has been overtightening of the clamp and/or misalignments when applying the clamp.

SUMMARY

The disclosed coupler for joining pipe ends provides split clamp components having a split or two-part clamping part. This split or two part clamping part avoids the stress put on the clamp as a result of tightening a unified clamping part from just one side. This split or two part clamping part also is easier to apply and align on the pipe ends. In a preferred embodiment, a gasket is provided to overlie the pipe ends within the tightened components as an addition sealing member.

DETAILED DESCRIPTION

Illustrative embodiments of the split clamp will be described with reference to the attached figures.

Figure 1:
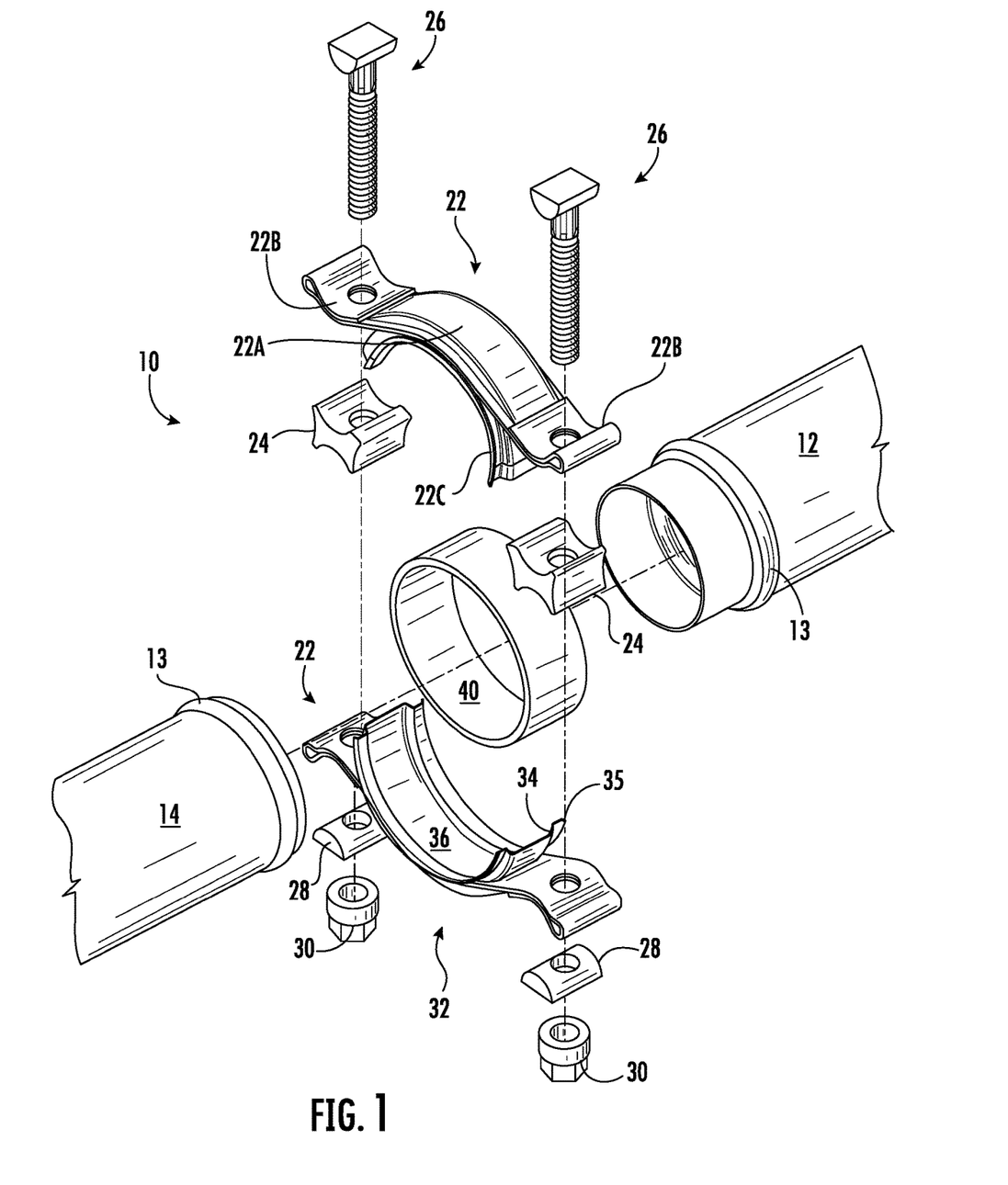
FIG. 1 is an exploded view of a split clamp components.

FIG. 1 is an exploded view of the clamp components 10 and the pipes, 12 and 14, which are to be connected. The pipe 12 has a male end and the pipe 14 has a female end that permit an overlapping joint that draws the circumferential collars 13 together, see FIG. 3. When the pipes are coupled, the collars 13 define an outward projection having a predetermined length or distance between the pipe bodies.

Figure 2:
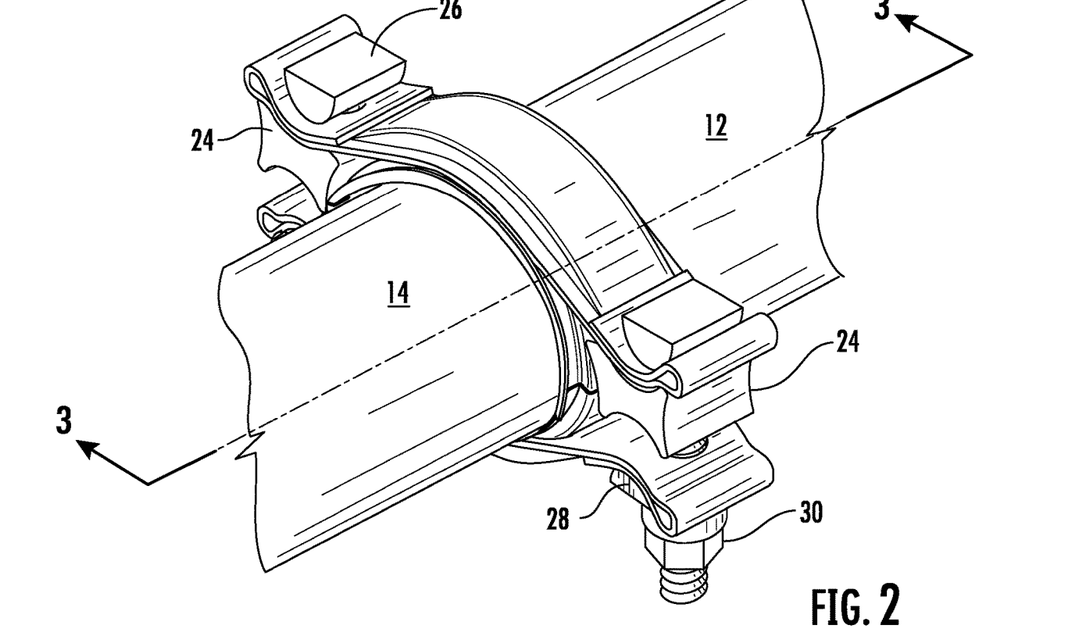
FIG. 2 illustrated the clamp of FIG. 1 assembled on the pipe ends.

The components of the split clamp or coupler are illustrated in FIG. 1 as upper and lower clamp halves 22, spacers 24, bolts 26, convex spacer 28 and nuts 30. Each clamp half has an upper portion 22A and a dependent lower portion 22C. The upper portion 22A is arcuate or bow shaped with upturned ends 22B that are concave and include bolts holes. For the upper clamp 22, the bolts 26 have convex heads that mate with the concave ends as the bolts 26 pass through the bolt holes, and for the lower clamp 22, convex spacer 28 is placed between end 22B and the nut 30, see FIG. 2. Although the clamp halves 22 are described as upper and lower clamp for purposes of discussion, it will be understood that the two clamps have the same structure and are interchangeable.

As shown in FIG. 1, the spacer 24 has upper and lower concavities that complement the arcuate or bow shapes of the clamps 22. The interior portion of the spacer 24 has an inner projection or end that is enlarged to resist deformation of the inner portion of the into an oval when the nuts are tightened to close the clamp, see FIG. 5.

Figure 3:
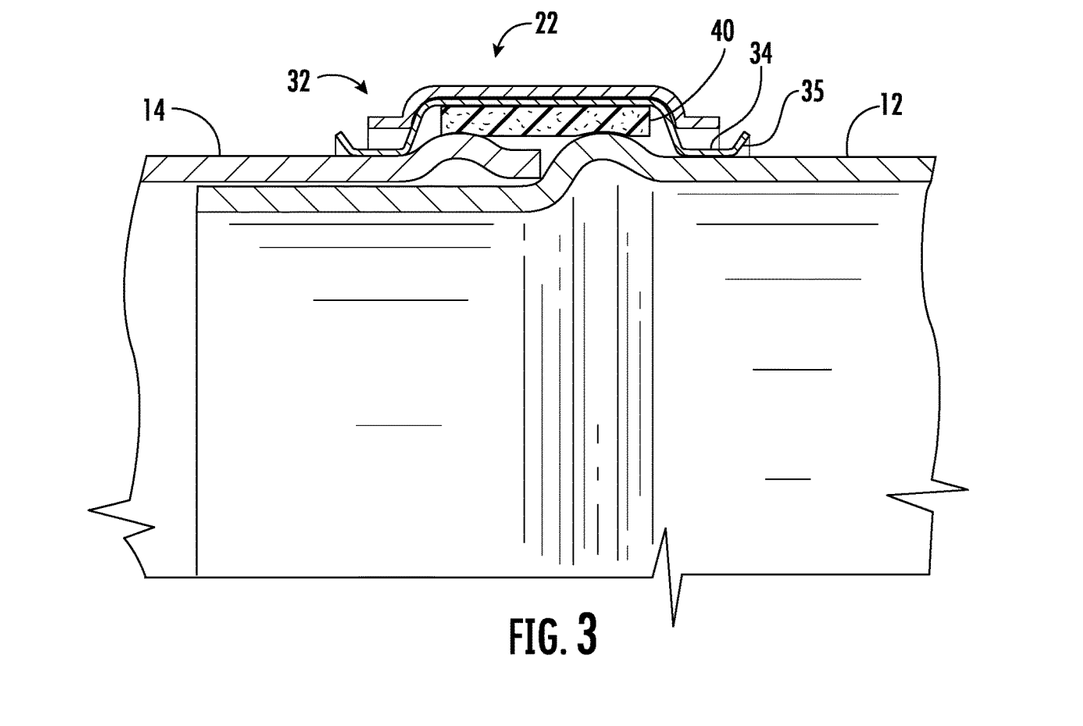
FIG. 3 is a section along the line 3-3 in FIG. 2.

With reference to FIG. 3, it can be seen that the upper portion and the dependent portion of the clamp half 22 have interior channels that overlie both collars 13. The dependent portion 22C has side walls 32 that terminate in feet 34 with up turned edges 35. From FIG. 3, it can be seen that the gasket 40 overlies the projections 13 and the pipe joint. In the preferred embodiments, the gasket 40 is a graphite gasket.

Figure 4:
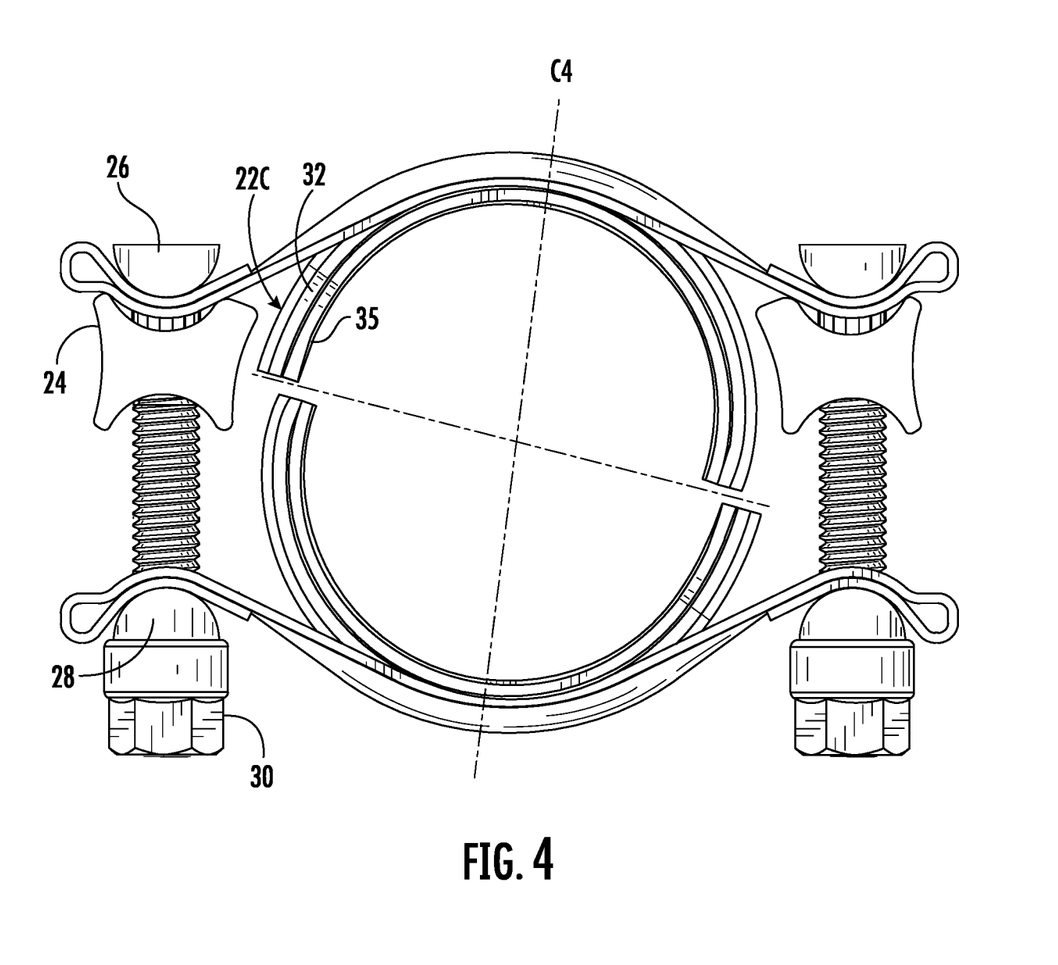
FIG. 4 is an end view of the split clamp components prior to being tightened together.
Figure 5:
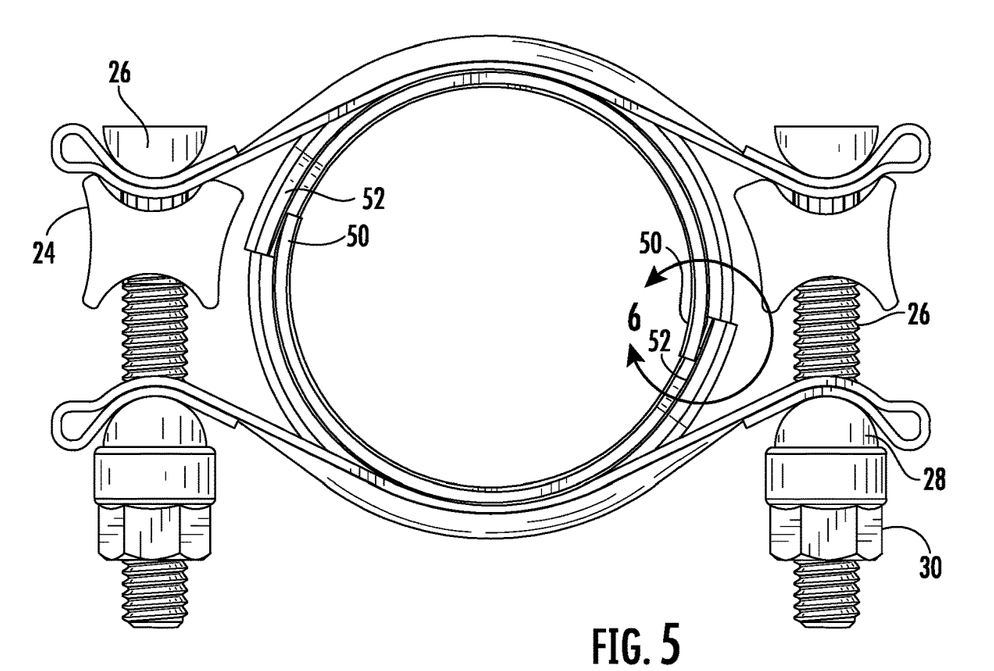
FIG. 5 is an end view similar to FIG. 4 illustrating the nesting of the components as a result of being tightened together.
Figure 6:
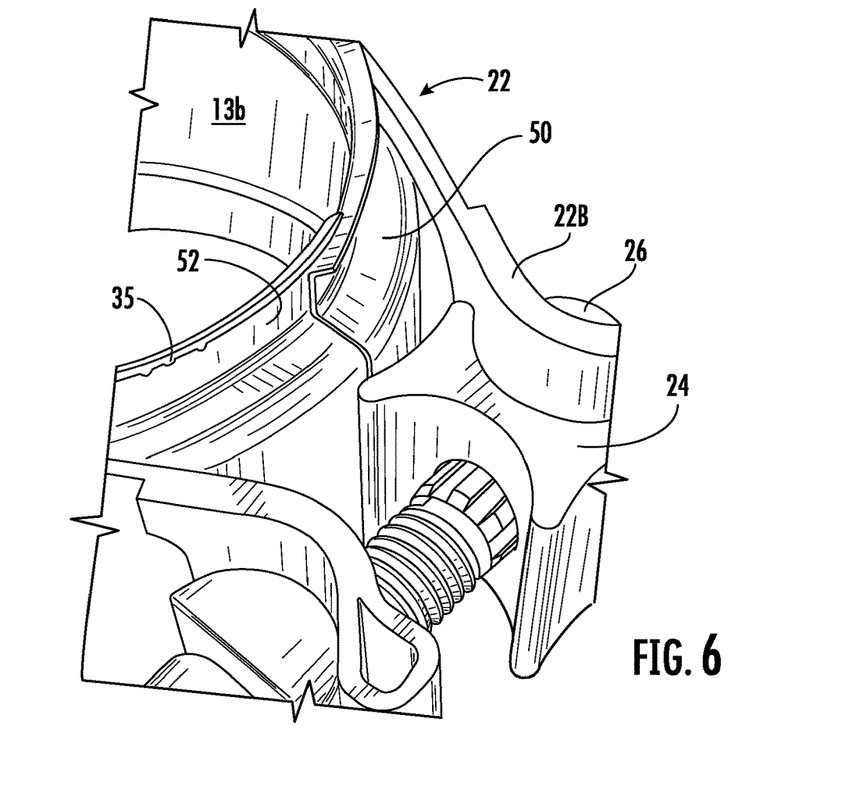
FIG. 6 is an enlarged view of the encircled area in FIG. 5.

The structure of the dependent portion 22C will be described in more detail with reference to FIGS. 4, 5, and 6. With reference to FIG. 4, it can be seen that the end of mating dependent portions 22C are not aligned horizontally. As shown in FIG. 4, a line drawing between the ends of the lower portions 22C does not have a perpendicular intersection with a centerline CL, i.e., it forms an acute angle. With reference to FIGS. 5 and 6, the ends 50 and 52 of the dependent portions 22C are chamfered so that the ends will form an intermeshing or nested connection rather than an abutting connection, see FIG. 6. This intermeshing provides a more circular interior to the closed coupler and helps to prevent pinching of the gasket 40.

From FIGS. 4, 5, and 6, it can be seen that one clamp half 22 is designated to carry the bolt 26 and the spacer 24 is pressed on the shoulder serrations of bolt 26 so they can be assembled as a unit.

Figure 7:
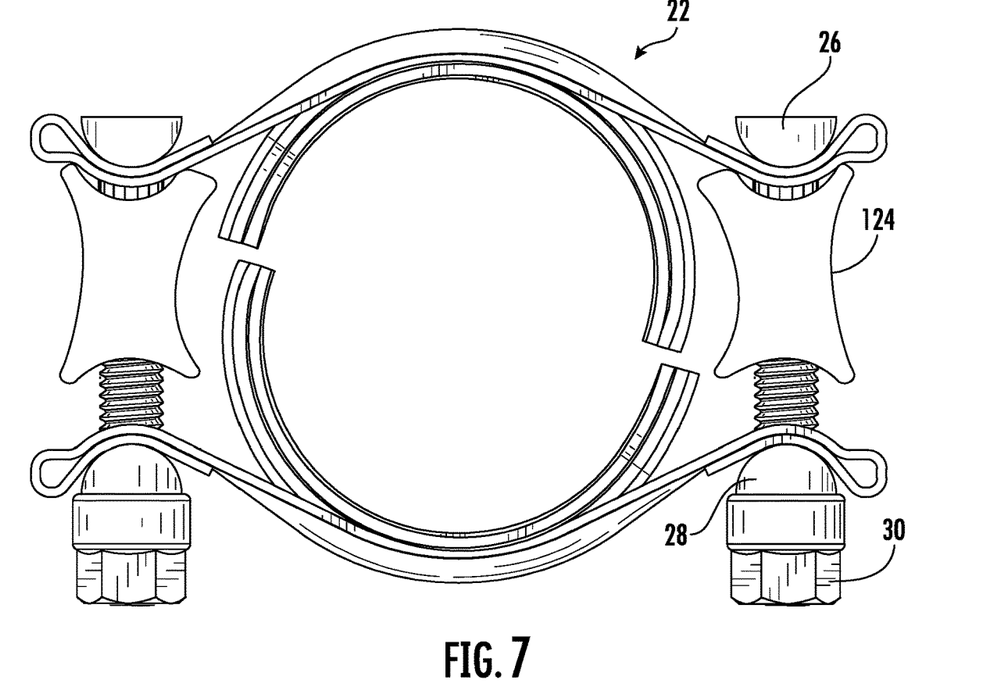
FIG. 7 illustrates the split clamp components with an elongated spacer prior to tightening the clamp.
Figure 8:
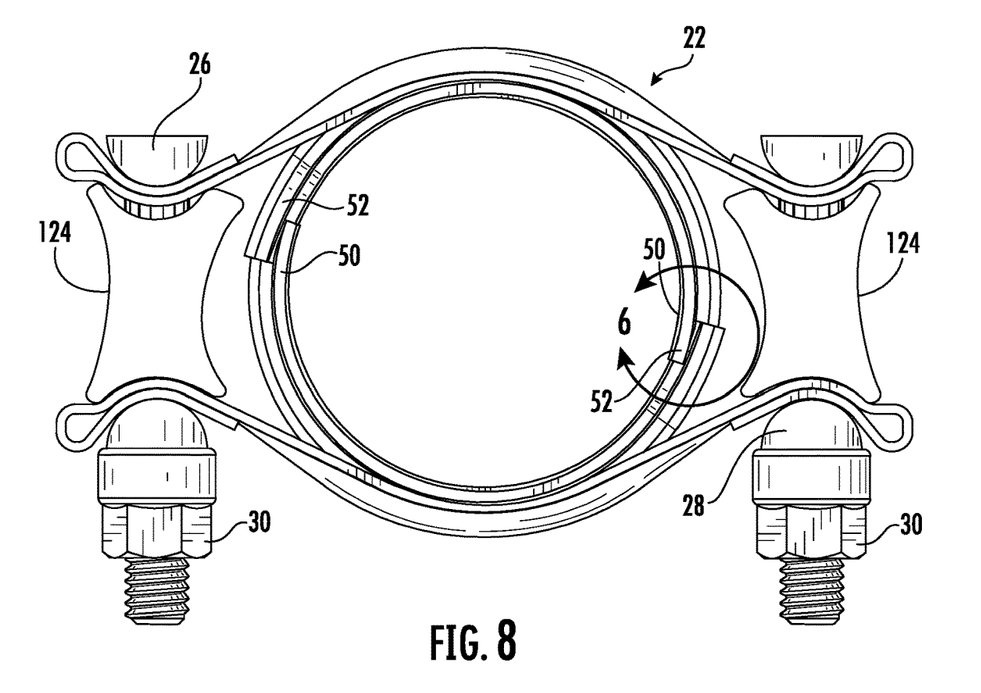
FIG. 8 illustrates the split clamp components with the elongated spacer after tightening.

With reference to FIGS. 7 and 8, another embodiment of the spacer 124 is shown. Spacer 124 differs from spacer 24 in that it has an increased length that is selected according to the application so that it will limit the closing of the clamps to that necessary to secure the clamps on the pipes 12 and 14 so there is a predetermined travel distance that avoids damage to the pipes and or the gasket 40 which seals the pipe joint.

Figure 9:
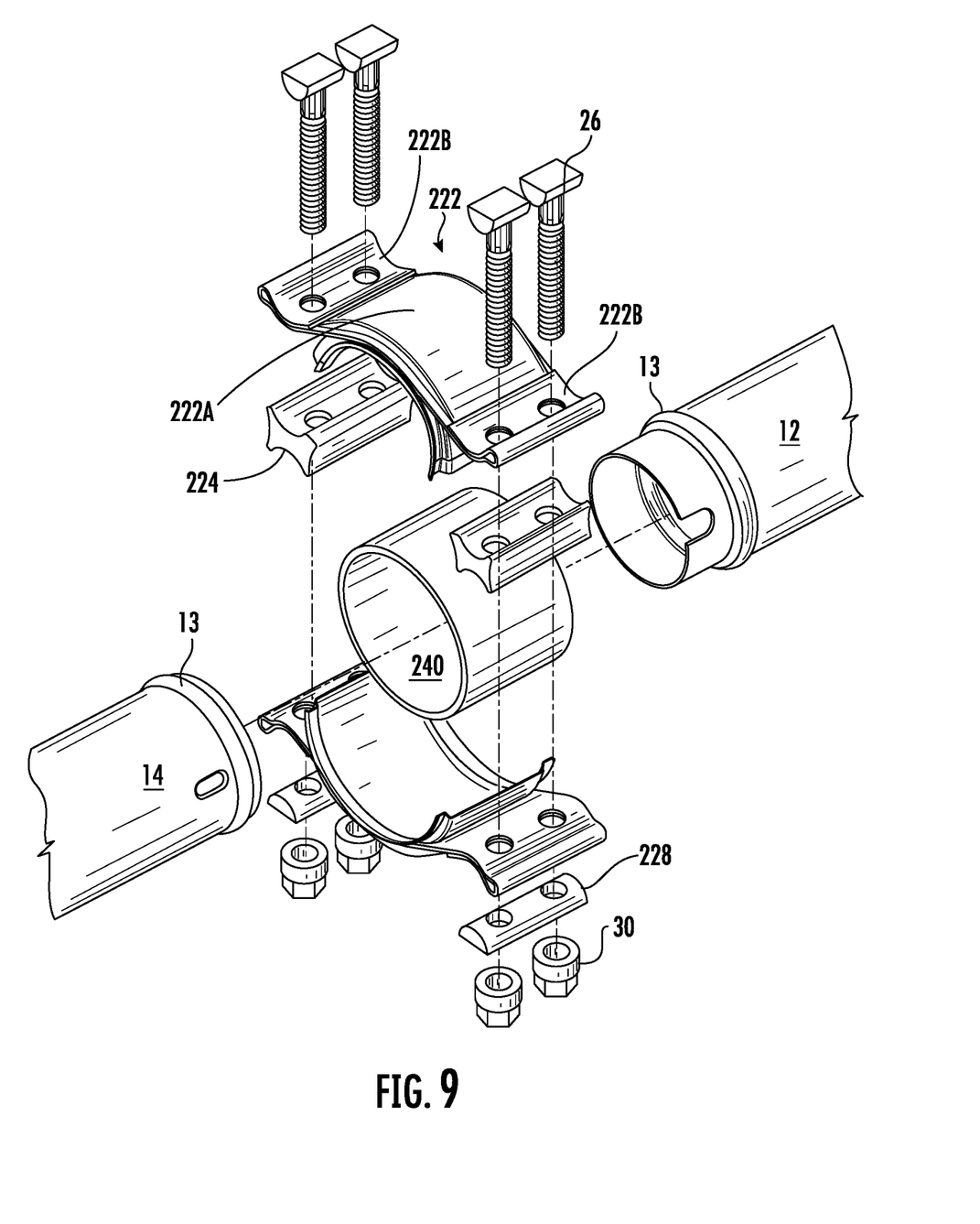
FIG. 9 is an exploded view of another embodiment of a split clamp prior to assembly on pipe ends.
Figure 10:
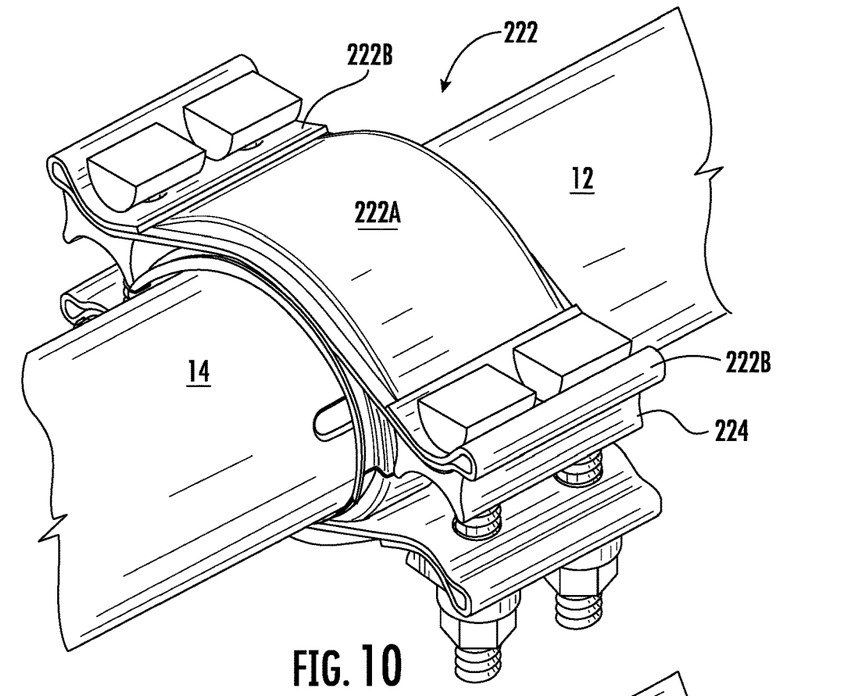
FIG. 10 illustrates the split clamp components of FIG. 9 assembled on the pipe ends; and, FIG. 11 illustrates the split clamp components of FIG. 9 with an elongated spacer.
Figure 11:
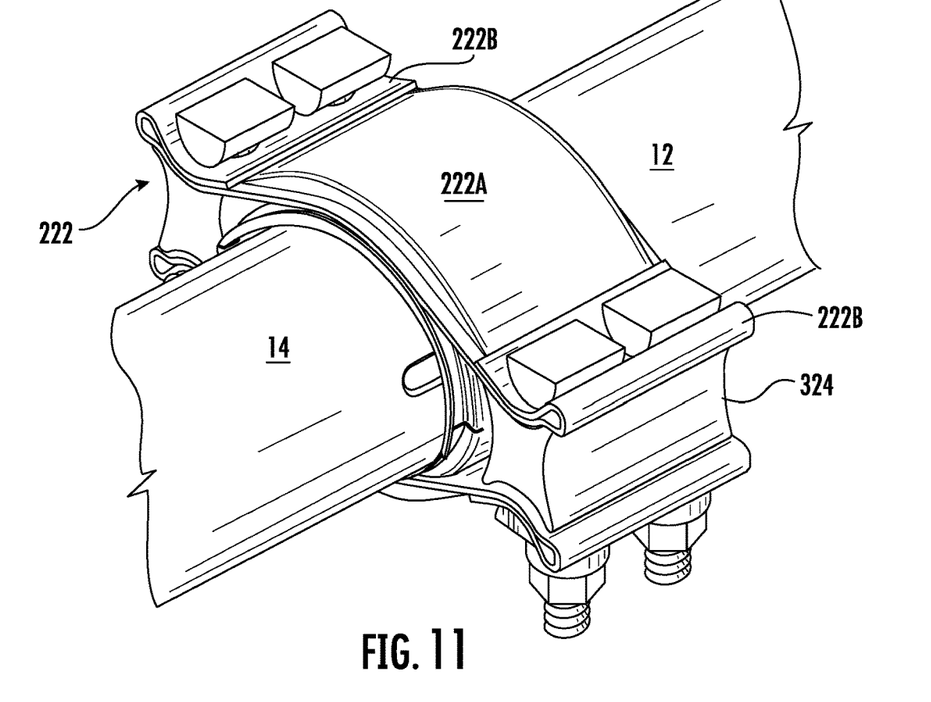

With reference to FIGS. 9 and 10, there is illustrated another embodiment which shares common components with the earlier embodiment except as described hereinafter. The clamp halves 222 in this embodiment are wider and the ends 228B are provide with two holes for bolts 26. In keeping with this wider configuration, the spacer 224, convex spacers 228 and gasket 240 have increased widths. In this embodiment, one clamp half is again designated as the bolt carrier and the spacer is pressed on the shoulder serrations. With reference to FIG. 11, it can be seen that this embodiment also can have a spacer 324 which is selected according to the application so that it will limit the travel during tightening of the clamp.

What is claimed is:

1. A coupler for connecting pipe ends, the coupler comprising:
   a pair of coupling bands, each coupling band has an concave outer portion that terminates in convex end portions having bolt holes on a common centerline through the apex of the convex end portions and a semicircular inner portion with dependent sides that are positioned beneath the concave outer portion define an interior channel;
   a gasket having an interior diameter dimensioned to overlap connecting pipe ends and a width that fits within the interior channel of the semicircular inner portion; and,
   a pair of threaded bolts that pass through the bolt holes in the convex end portions and a pair of nuts that are configured to engage with the pair of bolts and draw the convex end portions of the pair of coupling band together around connecting pipe ends;
   whereby the coupling bands are draw together by the bolts and nuts and the semicircular inner portion are free of contact with the threaded bolts.

2. The coupler of claim 1, wherein the semicircular inner portion of each coupling band has free ends that are chamfered so that the opposing free ends are nested when the coupling bands are drawn together.

3. The coupler of claim 2, wherein the free ends of the semicircular inner portions are offset with respect to each other and a line between the free ends forms an acute angle with a center line through the coupler.

4. The coupler of claim 2, further comprising a pair of spacers that surround the threaded bolts and have a length that limits tightening of the coupling bands.

5. The coupler of claim 1, wherein the dependent sides of the semicircular inner portions are spaced apart and configured to overlie circumferential collars on connected pipe ends.

6. A coupler for connecting pipe ends, the coupler comprising:
   a pair of coupling bands, each coupling band has an outer portion that terminates in convex end portions having bolt holes, configured to be aligned on a common centerline through the apex of the convex end portions, and a semicircular inner portion that has dependent sides that define an interior channel and chamfered ends;
   a gasket having an interior diameter dimensioned to overlap connecting pipe ends; and,
   threaded bolts that pass through the bolt holes on the common centerline and nuts that are configured to engage with the bolts and draw the pair of coupling band together and intermesh the chamfered ends, which remain free of contact with the threaded bolts.

7. A pipe coupler for coupling a pair of pipes that are configured for coupling together and have circumferential collars that are spaced by a predetermined distance when coupled together, the pipe coupler comprising:
   a pair of coupling bands, each coupling band has an arcuate outer portion that terminates in convex end portions having bolt holes on a common centerline through the apex of the convex end portions and a semicircular inner portion that has dependent sides that define an interior channel between the dependent sides that is at least equal to a predetermined distance between circumferential collars of the pair of pipes, the dependent sides terminating in feet with upturned edges; and,
   a pair of threaded bolts that pass through the bolt holes and a pair of nuts that are configured to engage with the pair of bolts and draw the pair of coupling band together around circumferential collars associated with the pair of pipes.

8. A coupler kit for coupling a pair of pipes that are configured for coupling together and have circumferential collars that are spaced by a predetermined distance when coupled together, the pipe coupler kit comprising:
   a pair of coupling bands, each coupling band has an arcuate outer portion that terminates in convex end portions having bolt holes on a common centerline through the apex of the convex end portions and a semicircular inner portion that has dependent sides that define an interior channel between the dependent sides that is at least equal to a predetermined distance between circumferential collars of the pair of pipes to be coupled, the dependent sides terminating in feet with upturned edges;
   a gasket that fits within the interior channel between the dependent sides and as a predetermined width to overlie the predetermined distance between circumferential collars of the pair of pipes to be coupled; and,
   a pair of threaded bolts that pass through the bolt holes and a pair of nuts that are configured to engage with the pair of bolts and draw the pair of coupling band together around circumferential collars associated with the pair of pipes to be coupled.

9. The kit of claim 8, further comprising a first pair of spacers that surround the pair of threaded bolts and are configured to be positioned between the pair of coupling bands.

10. The kit of claim 9, wherein the first pair of spacers have a length that is selected to establish a predetermined space between the pair of coupling bands.

11. The kit of claim 9, further comprising a second pair of spacers that surround the pair of threaded bolts and are configured to fit between the pair of nuts and one of the coupling bands.

12. The kit of claim 11, wherein the first pair of spacers have a length that is selected to preserve a predetermined space between the pair of coupling bands.

13. A closure for connecting ends of two pipes and sealing a pipe joint, the closure comprising:
   a pair of clamping members, each clamping member having:
      an upper portion that has a length greater than an outer diameter of two pipe ends to be joined and opposite ends, that have bolt holes on a common centerline through an apex in convex portions of the opposite end, are configured to receive a fastener with a head having a convex inner portion and a flat outer portion;
      a lower portion that depends from the upper portion and is configured as a semi-circle with outer flanges that define an interior diameter that complements the outer diameter of two pipe ends to be joined; and,
      a seal that is dimensioned to fit within the lower portions of the two clamping members and overlay the pipe joint;
   whereby the two clamping members are positioned opposite to each other around the two pipe ends to be joined and are drawn together to bring the outer flanges of the lower portions into contact with the outer diameter of the two connecting pipe ends.

14. The closure of claim 13, wherein an inner portion of each coupling band has free ends that are chamfered so that the free ends nest when the coupling bands are drawn together.

15. The closure of claim 13, wherein the free ends are offset with respect to each other and a line between the free ends forms an acute angle with a center line through the coupler.

16. The closure of claim 13, further comprising a pair of spacers that surround the threaded bolts and have a length that limits tightening of the coupling bands.

17. The closure of claim 13, wherein the semi-circle with outer flanges of the lower portion are spaced apart and configured to overlie circumferential collars on the two connecting pipe ends.

* * * * *